United States Patent [19]

Bunting et al.

[11] 3,742,057

[45] June 26, 1973

[54] CHELATED SODIUM COMPOUNDS

[75] Inventors: William Bunting, Baton Rouge, La.; Arthur W. Langer, Jr., Watchung, N.J.

[73] Assignee: Esso Research and Engineering Company, Linden, N.J.

[22] Filed: Feb. 27, 1970

[21] Appl. No.: 15,286

[52] U.S. Cl. ...... 260/583 P, 252/431 N, 260/563 R, 260/668 R, 260/695, 260/701
[51] Int. Cl. ...................... C07c 87/20, C07c 87/38
[58] Field of Search...................... 260/583 P, 563 R

[56] References Cited
UNITED STATES PATENTS 3,541,149 11/1970 Langer ............................ 260/583 P
3,206,519 9/1965 Eberhardt........................ 260/583 P
3,451,988 6/1969 Langer ............................ 260/583 P

*Primary Examiner*—Lewis Gotts
*Assistant Examiner*—C. F. Warren
*Attorney*—Chasan and Sinnock and Jack Matalon

[57] ABSTRACT

Chelated organosodium compounds comprising an organosodium having the formula RNa wherein R is a non-alkyl, hydrocarbon radical complexed with an aliphatic or cycloaliphatic tertiary chelating polyamine are prepared by admixture of the desired polyamine and organosodium. Such compounds have utility as catalysts, e.g. in telomerization and polymerization reactions, as additives, for separations, in making batteries, and in synthetic chemisty.

21 Claims, No Drawings

CHELATED SODIUM COMPOUNDS

THE PRIOR ART

It is known that it is possible to obtain stable catalytic complexes comprising organolithiums complexed with bifunctional Lewis bases, particularly with non-aromatic tertiary diamines (U.S. Pat. No. 3,451,988) for use mainly in polymerization and telomerization reactions. Further, it is known that the use of a mixture of organosodium and organolithium in place of the organolithium component in the above catalytic complex will reduce the chain length resulting from telomerization reactions, thus yielding products of lower average molecular weight than otherwise would be obtained under similar conditions (U.S. Pat. No. 3,206,519). In either case, the organic radical attached to the alkali metal was preferably an alkyl group. Most commonly used were n-butyllithium and n-amyl or n-butylsodium.

While amines other than diamines have been considered, they have generally been ruled out as being unsatisfactory. Monofunctional tertiary amines such as triethylamine in combination with organolithium have achieved satisfactory results as catalysts only when the amine was used in exceedingly large amounts, i.e., solvent quantities (U.S. Pat. No. 3,451,988). In the same patent it was further shown that triamines used with alkyllithiums were unsuitable as catalysts for polymerizations because of their inactivity.

Recent publications (Dutch Pat. applications Nos. 6084412 and 6804487) have attempted to show that complexes of the above type may be prepared from organosodium complexed with a tertiary aliphatic diamine. Here again, the preferable organosodium is an alkyl sodium. This catalyst system has, however, distinct disadvantages as compared to the organolithium-diamine complex system. It is quite unstable and begins to decompose immediately on forming at a relatively rapid rate. Therefore, the complex must be prepared in situ in order to have any usefulness. Isolation of this type of complex for any appreciable period would, of course, be impossible.

THE PRESENT INVENTION

It has now been unexpectedly discovered that stable chelated sodium compounds can be prepared by complexing organosodium compounds with aliphatic or cycloaliphatic tertiary chelating polyamines. It is necessary that the polyamine be a tri- or higher amine and that the organic radical of the organosodium compound be other than alkyl. This is quite unexpected in light of the prior art teachings that the preferable organosodium must be an alkyl sodium, whereas in the present invention, alkyl sodium is completely unsuitable. Further, contrary to the prior art, diamines will not achieve a satisfactory result. It is necessary that tri- or higher amines be employed.

The complexes obtained in this invention are not only more stable than those alleged to have been obtained using alkylsodium compounds with diamines, but they are also more stable than those obtainable using the preferred alkyllithium compounds with diamines. In fact, the present compounds may be isolated and are stable for extended periods of time. The advantages of this system over the prior art include the comparative cheapness of sodium compounds as compared to lithium compounds and the ability to prepare the desired complex in stable form long prior to use. This allows storage and shipment of the complex itself in ready-to-use form.

Major advantages as compared to conventional organosodiums include the ability to obtain high purity organosodium compounds. Further, contrary to conventional organosodiums, the present compounds possess relatively high hydrocarbon solubilities allowing their use in reactions in which organosodiums had been previously unsatisfactory.

THE ORGANOSODIUM

Organosodiums useful for this invention can be described by the formula RNa, wherein R is a hydrocarbon radical derived from a parent hydrocarbon having a replaceable hydrogen with a $pK_a$ in the range of about 11 (fluoradene) to about 38 (tryptycene). Compounds having $pK_a$'s above this upper limit could lead to rapid decomposition of the complex via metalation of the chelating agents. Preferably, R will be selected from the group consisting of aryl, aralkyl, alkaryl, and unsaturated hydrocarbons having at least one allylic hydrogen. The most preferable R groups include benzyl, phenyl, allyl, triphenylmethyl, fluorenyl, naphthyl, cyclopentadienyl, octenyl, etc.

THE POLYAMINE

The polyamines which may be employed as chelating agents are any aliphatic or cycloaliphatic tertiary chelating polyamines containing at least three amine groups. Preferably, the polyamine will have the following formula:

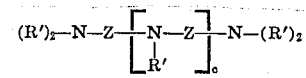

wherein R' can be the same or different alkyl or cycloalkyl group having from one to about 10 carbon atoms, Z is selected from the group consisting of (1) a $C_4$-$C_{10}$ cycloaliphatic radical attached to N at the 1,2- or 1,3-positions and (2) 2 to 3 methylenic radicals wherein each contains 0 to 2 monovalent aliphatic hydrocarbon radicals of 1 to 6 carbon atoms; and c is an integer of 1 to 10,000, preferably an integer from 1 to 4. Suitable non-limiting examples include:

N,N,N',N'',N''-pentamethyldiethylene-triamine(PMDT),
N,N,N',N'',N''',N'''-hexamethyltriethylenetet-raamine(HMTT),
tris-(β-dimethylaminoethyl)amine(iso-HMTT),
octamethylpentaethylenehexamine(OMPH),
heptamethyltetraethylenepentaamine(HMTP),
N-(β-dimethylaminoethyl),N,N'-trimethyl-cyclohexane-1,2-diamine,
methyl di-(γ-dimethylaminopropyl)amine, and the like.

SYNTHESIS OF THE COMPLEX

The complex may be readily prepared by mixing the organosodium to be complexed with the desired polyamine in an inert diluent. Suitable inert diluents include, but are not limited to, hydrogen-containing solvents having a $pK_a$ above about 38. Within this classification fall hydrocarbons and tertiary amines such as propane, cyclopentane, heptane, methylcyclopentane, isooctane, cetane, triethylamine, dimethyldodecylamine, tetramethylethylenediamine, etc.

Alternatively, preparation of the complex may be effected by using excess chelating agent as solvent or by mixing the organosodium with the chelating agent of choice in stoichiometric amounts.

Another method for preparing the complex involves transmetalation. In this method, the chelating agent of choice is mixed with an organosodium (in which the organic radical is not the preferred one) by one of the methods described above. Thereafter, the resultant complex is subjected to transmetalation by mixture with the hydrocarbon from which the preferred organic radical is derived. The hydrocarbon in this case may either be used as the solvent or may be dissolved in the inert diluent described above. Alternatively, all components may be mixed simultaneously and both complexation and metathesis occur in situ.

Another method for preparing the complex is analogous to the preceding method except that here the organosodium is one of choice, but the chelating agent is not one of choice. After preparing the non-preferred complex by one of the above methods, the non-preferred chelating agent moiety is exchanged for the preferred chelating agent moiety by mixing the complex (utilizing one of the former methods) with the desired chelating agent.

The complex may be readily prepared at temperatures from about −100° C. to about 150° C; preferably 0° to 100° C; the latter temperature range is preferred because of convenience and also since higher temperatures favor dissociation of the less stable complexes. Pressures may range from subatmospheric to 100 psig or more. For convenience sake, atmospheric pressures are preferred.

The molar ratio of organosodium to chelating tertiary polyamine is not critical and from about 0.1 to about 50, preferably 0.5 to 10, moles of complexing agent per mole of organosodium is generally employed; the complexing agent may also be employed as a solvent. However, it should be understood that the amount of complexing agent employed may influence the structure of the resultant complex. In this regard, it has been found that true complex formation occurs only with certain specific ratios; that is, if an incorrect ratio (for true compound formation) were employed, the product would have predominantly the composition of the nearest true compound and it would consist of a mixture of several compounds. Although 1:1 complexes are preferred, it is within the scope of this invention to prepare and isolate complexes of other stoichiometries such as 1:2 and 2:1.

Of course, the minimum amount of complexing agent should be that stoichiometric amount required to produce the desired type of complex (where more than one type of complex is possible from a particular organosodium and a particular complexing agent). Where only one type of complex can be formed or where one is not concerned with the particular type of complex to be formed (assuming more than one type is possible), it is desirable to employ amounts of complexing agent in excess of the stoichiometric amount. When the transmetalation reaction is employed, the compounds being metalated should be present in an amount sufficient to replace all of the R in RNa and should preferably be in excess, e.g., 50 percent excess or higher in order to drive the reaction to completion.

USES OF THE COMPLEX

The complexes of this invention may be used as highly efficient catalysts for telomerizing conjugated diolefins with weak hydrocarbon acids. Although molecular weights of the resulting telomers can be varied widely, this process is particularly useful for making previously unobtainable low molecular weight products. Other catalytic systems known in the art produce mainly high molecular weight telomers. The products themselves are useful as reaction intermediates in plasticizer alcohol synthesis, in the synthesis of flame retardants for materials such as polypropylene, in surface coatings, etc.

The conjugated diolefins useful in telomerization include butadiene, isoprene, 2,3-dimethylbutadiene, piperylene, and the like. Although not restricted in size, the monomers will normally contain 4–12 carbon atoms. Substituents may be present in the monomers only if they do not cause decomposition of the organosodium. Acceptable substituents include but are not limited to alkyl, cycloalkyl, dialkylamino, and trialkylsilyl groups.

The weak hydrocarbon acids which may be used in this telomerization are selected from the group consisting of aromatics, substituted aromatics, and olefins. Again, the substituents must be incapable of causing decomposition of the organosodium. The aromatic compounds may include aromatic hydrogen heterocycles such as pyridine and its derivatives. The preferred aromatics include benzene and its various alkyl derivatives, biphenyl, diphenylmethane, etc. Methyl substituted aromatics are most preferred for making low molecular weight telomers. These acids are preferably used as solvents but inert diluents may be added to increase telomer molecular weight.

The telomerization process may be carried out at temperatures in the range of −50° C. to +150° C., but 0° C. to 100° C. is preferred. Pressures range from subatmospheric to 100 psig or more, the lower pressure favoring formation of low molecular weight telomers. When very low molecular weight products are desired, the monomer may be introduced into the gas phase above the catalyst solution, or it may be bubbled into the catalyst solution neat or diluted with an inert gas such as methane or argon.

A particularly interesting feature of this telomerization is the ability to achieve high yields of the monoadduct catalytically. For example, toluene and butadiene can be telomerized under conditions which produce over 80 percent selectivity to pentenylbenzene. Catalyst efficiencies greater than 500 g/g benzylsodium have been obtained.

A further use of this invention is the separation of sodium compounds from themselves, from other Group I-A and Group II-A organometallics and the separation of the chelating polyamines from themselves and other materials. Thus, chelating polyamines may be separated and/or purified from isomeric and/or homologous non-chelating Lewis bases or other materials. The chelating polyamines may be purified by complexing therewith with one of the organosodiums mentioned previously; the polyamine (and the organosodium) may then be recovered in pure form by first isolating and then destabilizing the complex. This destabilization is readily accomplished by addition of polar solvents to the complex (e.g. addition of water, methanol, etc.); addition of aqueous or anhydrous acids or bases (e.g. hydrochloric acid, sulfuric acid, sodium hydroxide, diglyme, potassium hydroxide, etc.) or by heating the complex, neat or in solution, under vacuum or ambient pressure at a temperature in the range of 30°–250° C., depending on the stability of the complex.

Further, by taking advantage of the fact that the structure of the polyamine used will to a large extent determine the stability of the resultant complex, it is possible to separate chelating polyamines from one another. Of course, stability also depends upon the temperature of the reaction medium; higher temperatures favor dissociation of the less stable complexes. Temperature, then, may be adjusted to selectively complex the desired chelating polyamine.

The purification and/or separation processes described above may, of course, be advantageously utilized with column and counterflow techniques, i.e., the organosodium (complexed or uncomplexed) may be contacted with a counter-flow of a hydrocarbon solution of the chelating polyamine and the resultant complex may then be subjected to destabilization to recover the desired polyamine in the pure state.

These novel complexes may also be used as additives, e.g. as oxygen or carbon dioxide scavengers in purification processes. Further uses include utility as catalysts, in making batteries, as reducing agents, and in synthetic chemistry.

This invention may be illustrated by the following examples:

EXAMPLE 1

To 1.1 g (10 mmoles) of benzylsodium were added 25 ml of benzene and 1.73 g (10 mmoles) of PMDT. The solution was stirred 1 hour and filtered. The filtrate was slowly and partially evaporated to give yellow crystals of composition PMDT • BzNa. Calc'd. for PMDT •BzNa: C, 66.9; H, 10.5; N, 14.6. Found: C, 65.5; H, 10.4; N, 14.6. An attempt to isolate a 1:1 complex between benzylsodium and TMED under the same reaction conditions was unsuccessful.

EXAMPLE 2

To 1.0 g (10 mmoles) of phenylsodium were added 25 ml benzene and 1.73 g (10 mmoles) PMDT. The suspension was stirred at room temperature for 1 hour and filtered. The filtrate was slowly and partially evaporated to give crystals of PMDT • PhNa. Calc'd. for PMDT • PhNa: N, 15.4. Found: N, 15.6.

The following chelated organosoidum compounds were isolated in a manner similar to PMDT • PhNa:

| Compound | % N Found | Calc'd. |
|---|---|---|
| iso-HMTT • BzNa | 16.58 | 16.3 |
| HMTP • BzNa | 16.61 | 17.45 |
| OMPH • BzNa | 19.17 | 18.35 |
| PMDT • m-xylylsodium | 11.86 | 13.95 |
| PMDT • allylsodium | 15.09 | 17.6 |

This example shows that stable complexes may be prepared containing an aryl, allyl, aralkyl, and alkaralkyl sodium compound may be prepared with tridentate and higher polydentate chelating amines.

EXAMPLE 3

To a one liter 4-neck flask, oven dried, fitted with a magnetic stirrer, 1 thermometer, septum cap, gas inlet tube (above the liquid level) and addition funnel under nitrogen was charged 500 ml toluene (dried over $CaH_2$), 5 mmoles of benzylsodium and 5 ml of 1M PMDT. The reaction was heated to 50° C. and butadiene gas was introduced through the gas inlet tube at rates varying between 50 cc/min. and 700 cc/min. for 2 hrs. At the end of this time the reaction was quenched with 5 ml water, washed with water, and dried ($K_2CO_3$). A weighed fraction of the reaction product was distilled. Approximate selectivity (wt. percent) was determined by GC to be mono-adducts 20 percent, di-adducts slightly less than 20 percent, higher distillable adducts 30 percent, and bottoms 30 percent. The structures of the mono-adducts were determined by GC, GC-mass spectra, and infrared to be I and II.

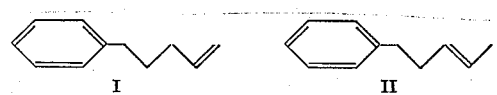

EXAMPLE 4

To 0.5g of benzylsodium and 600 ml of toluene was added 0.7 ml of iso-HMTT. The reaction was heated to 80° C. Butadiene was then introduced into the atmosphere above the reaction at a rate of 250 cc gas/min. for 5 hrs. At the end of this time 10 ml of water was added, and the organic layer separated and dried ($K_2CO_3$). The toluene was removed under vacuum and the residue fractionally distilled at water aspirator pressure to give 75g of mono-adduct. The ratio of alpha to internal unsaturation was 1.25. The total reaction product weighed 281g (560g/g BzNa). Further, this example shows that less than stoichiometric amounts of chelating agent can be used.

EXAMPLE 5

The effect of varying the chelating agent was ascertained as follows: to 2.63 mmoles benzylsodium were added either no chelating agent or 2.63 mmoles and 50 ml toluene. The reaction was heated to 40° C. and maintained at 40° C. while gaseous butadiene was introduced into the atmosphere above the reaction at the rate of about 22 cc/min. for two hours. At the end of this time 5 ml of water was added and the organic layer separated and dried ($K_2CO_3$). The toluene was removed at water aspirator pressure and the residue distilled (140° C/0.05mm). The distillate was analyzed by GC.

| Chelating Agent | Total Product g. | Selectivity to Mono-Adduct % | Alpha/Internal Unsaturation |
|---|---|---|---|
| None | 6.0 | 34 | 0.5 |
| TMED (a) | 15.8 | 32 | 0.5 |
| PMDT | 9.4 | 37 | 1.1 |
| iso-HMTT | 13.3 | 45 | 1.6 |
| HMTP | 17.5 | 60 | 1.4 |
| OMPH | 15.8 | 59 | 1.5 |
| Triglyme | NO REACTION | | | a. Tetramethylethylenediamine.

The use of triglyme as a chelating agent gave an inactive catalyst. Presumably the catalyst decomposed via metalation of the chelating agent. In terms of selectivity to mono-adduct and alpha/internal unsaturation, the TMED • BzNa gives results similar to benzylsodium alone, whereas complexes containing the higher chelating agents differ markedly from benzylsodium alone. This is a reflection of the relative stability of the complexes. At 40° C. TMED • BzNa is a relatively weak complex while PMDT • BzNa and the complexes with higher chelating agents are relatively strong complexes. The effect of chelating agent on the nature of the catalyst is further defined in Example 6.

EXAMPLE 6

In this example, the reaction conditions were the same as in Example 5 except 13.15 mmoles of chelating agent were used instead of 2.63 mmoles. Hence, the ratio of chelating agent to benzylsodium was 5:1.

| Chelating Agent | Total Products g. | Selectivity to Mono-Adduct, % | Alpha/Internal Unsaturation |
|---|---|---|---|
| PMDT | 14 | 39 | 1.03 |

This example shows that beneficial results may sometimes be obtained by the use of greater than stoichiometric amounts of chelating agent.

EXAMPLE 7

To 1.6 ml of 1.6 N n-Butyllithium in hexane were added 50 ml toluene and 0.6 ml PMDT, generating PMDT • BzLi in situ. The reaction was maintained at 40° C. while butadiene was introduced into the atmosphere above the reaction at a rate of 22 cc/min. for 2 hrs. At the end of this time the reaction was quenched with 5 ml of water. The organic layer was separated, dried ($K_2CO_3$), and the solvent removed under vacuum to give 5 g. of a product having $M_n$=2549. This example shows that organolithium • amine complexes are significantly less reactive in the chain transfer step of telomerizations than the analogous organosodium complexes.

EXAMPLE 8

To 0.95 ml of 1.6 N n-butyllithium (1.5 mmoles) were added 50 ml toluene, 0.17g (1.5 mmoles) benzylsodium and 0.45 ml (~3 mmoles) TMED. The reaction was heated to 40° C. and maintained at that temperature while gaseous butadiene was introduced into the atmosphere above the reaction at the rate of 22 cc/min. for two hours. At the end of this time, the reaction was quenched with 5 ml of water and the organic layer separated and dried ($K_2CO_3$). The toluene was removed at water aspirator pressure and the residue distilled (140°/0.05 mm). The distillate was analyzed by gas chromatography. Total product weight was 6.1g. Selectivity to mono-adduct was 8.6 percent. The ratio of alpha to internal unsaturation was 1.25. This example shows that the use of an amine • organolithium • organosodium catalyst changes the nature of the reaction. The effect of the organolithium is to change the catalyst to one favoring formation of higher molecular weight telomers with a corresponding decrease in the yield of mono-adduct.

EXAMPLE 9

Effect of temperature on the reaction. To 2.63 mmoles iso-HMTT • BzNa was added 50 ml of toluene. Butadiene was then introduced into the reaction atmosphere at 22 cc/min. for two hours.

| Temp. | Telomer Yield g. | Selectivity to Mono-Adduct, % | Alpha/Internal Unsaturation |
|---|---|---|---|
| 20 C. | | | 1.7 |
| 5 | 8.6 | 6.2 | |
| 40 | 13.3 | 45 | 1.6 |
| 70 | 15.0 | 67 | 0.9 |

This example shows that as the reaction temperature is increased, the rate of chain transfer increases faster than the rate of polymerization. Consequently, activation energy for chain transfer is higher than activation energy for polymerization. The ratio alpha/internal unsaturation shows that the rate of product isomerization also increases with higher temperature.

EXAMPLE 10

To 2.63 mmoles of iso-HMTT • BzNa was added 50 ml of toluene. The reaction was heated to 70° C. and maintained at that temperature while butadiene was introduced at various rates and for various periods of time.

| $C_4H_6$ Rate, cc/min. | Time, min. | Selectivity of Mono-Adduct, % | Alpha/Internal Unsaturation |
|---|---|---|---|
| 22 | 120 | 67 | 0.88 |
| 44 | 60 | 63 | 0.91 |
| 66 | 40 | 59 | 1.03 |
| 110 | 24 | 57 | 1.35 |

This example shows that product isomerization occurs. Further, more rapid addition of butadiene decreases selectivity to mono-adduct.

EXAMPLE 11

To 0.3g benzylsodium were added 50 ml of toluene and 0.7 ml of iso-HMTT. To this reaction mixture at 70° C. was added dropwise a solution of 20 ml isoprene in 25 ml toluene over a period of 80 min. A work-up similar to Example 5 was used. The toluene-isoprene telomer product weighed 23.8g. Selectivity to mono-adduct was 64 percent based on GC analysis. This example shows that isoprene is a suitable conjugated diolefin in the telomerization reaction.

EXAMPLE 12

To 0.26g (2.63 mmoles) of phenylsodium were added 50 ml of benzene and 0.7 ml of iso-HMTT. The reaction was maintained at 70° C. while butadiene was introduced into the atmosphere above the reaction at a rate of 22 cc/min. for 2 hrs. A work-up similar to Example 8 gave 7g of benzene-butadiene telomer product with $M_n$=998. This example shows that benzene is a suitable hydrocarbon acid in the telomerization reaction.

EXAMPLE 13

The active benzylsodium catalyst in toluene-butadiene telomerization can be generated by reacting an organo-sodium compound more basic than benzylsodium with toluene. The MSAD acidity scale (Donald J. Cram, Fundamentals of Carbanion Chemistry, Academic Press, N.Y., 1965, p. 19) may be used as a guide to which organosodium compounds are more basic than benzylsodium. Phenylsodium and allylsodium are suitable examples. Hence, to 0.26g (2.63 mmoles) phenylsodium were added 50 ml of toluene and 0.7 ml (~2.63 mmoles) iso-HMTT. To this reaction mixture at 70° C. was added butadiene by introducing it into the atmosphere above the reaction at the rate of 66 cc/min. for 40 min. A work-up similar to that in Example 5 was used. Total toluene-butadiene telomer weighed 13.1g; GC analysis showed selectivity to mono-adduct to be 62 percent. The ratio of the alpha/internal unsaturation was 1.1. The mono-adducts were determined to be pentenylbenzenes rather than butenylbenzenes on the basis of retention time and amount formed (53 mmoles pentenyl benzenes versus 2.63 mmoles of catalyst. Comparison of the above results with the results for iso-HMTT • BzNa under identical reaction conditions (Example 10) shows that iso-HMTT • BzNa was the active catalyst in this example.

EXAMPLE 14

PMDT • Benzylsodium is an extremely active catalyst in butadiene/toluene telomerization. Chain transfer occurs readily allowing the synthesis of mono-, di-, etc. butadiene adducts.

To a red-orange solution consisting of 500 ml toluene, 5 mmoles benzylsodium, and 5 mmoles PMDT at 50° under a nitrogen atmosphere was added butadiene at the rate of 300–700 ml/min. for two hours. The reaction was quenched with 5 ml water and transferred to a separatory funnel. The reaction mixture was washed with water and dried ($K_2CO_3$). To determine approximate yields, a weighed sample of the reaction was distilled at 185° (0.01mm). The residue accounted for 30 percent of the products. The toluene was removed from the distillate and the residue gas chromatographed. GC, IR, and tandem GC-mass spectra showed that both 1,2- and 1,4- attack on butadiene had taken place. Mono-butadiene adduct is about 20 percent of product; di-adduct slightly less than 20 percent; higher distillable adducts about 30 percent.

EXAMPLE 15

Organosodium compounds are extremely difficult to obtain in pure form due to insolubility in inert solvents and high reactivity with other solvents. PMDT • NaBz was prepared from commercial (Orgmet) benzylsodium. The commercial benzylsodium and the PMDT •benzylsodium were analyzed. Calc'd. for benzylsodium: C, 73.7; H, 6.13. Found for benzylsodium: C, 42.44; H, 3.57. Calc'd. for PMDT-benzylsodium: C, 67.0; H, 10.45; N, 14.6. Found for PMDT-benzylsodium: C, 65.54; H, 10.38; N, 14.61. This experiment shows that pure organosodium compounds can be prepated by chelation.

While the above examples adequately illustrate the invention, it should be understood that the present invention in its broadest aspects is not necessarily limited to the specific materials, conditions and procedures shown therein. The present invention is limited only by the claims which follow.

What is claimed is:

1. A complex of:
   a. an organosodium having the formula RNa wherein R is a hydrocarbon group derived from a parent hydrocarbon having a replaceable hydrogen with a pKa in the range of 11 to 38 and
   b. an alkylene or cycloalkylene tertiary chelating polyamine containing at least three amine groups.

2. The complex of claim 1 wherein R is a hydrocarbon group selected from the group consisting of aryl, aralkyl, alkaryl, and unsaturated hydrocarbons having at least one allylic hydrogen.

3. The complex of claim 1 wherein R is a hydrocarbon group selected from the group consisting of benzyl, phenyl, and allyl.

4. The complex of claim 1 wherein the polyamine is one having the formula

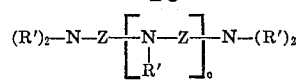

wherein R' can be the same or different alkyl or cycloalkyl group having from 1 to 10 carbon atoms, Z is selected from the group consisting of (1) a $C_4$-$C_{10}$ cycloalkylene group attached to N at the 1,2- or 1,3- positions and (2) 2 to 3 methylenic groups wherein each contains 0 to 2 monovalent aliphatic hydrocarbon groups of 1 to 6 carbon atoms; and c is an integer of 1 to 6.

5. The complex of claim 4 wherein R in RNa is a hydrocarbon group selected from the group consisting of aryl, aralkyl, alkaryl, and unsaturated hydrocarbons having at least one allylic hydrogen.

6. The complex of claim 5 wherein c is an integer from 1 to 4.

7. The complex of claim 4 wherein R in RNa is a hydrocarbon group selected from the group consisting of phenyl, benzyl, and allyl.

8. The complex of claim 7 wherein c is an integer from 1 to 4.

9. The complex of claim 4 wherein c is an integer from 1 to 4.

10. A complex of:
    a. an organosodium having the formula RNa wherein R is a hydrocarbon group derived from a parent hydrocarbon having a replaceable hydrogen with a pKa in the range of 11 to 38 and
    b. an alkylene tertiary chelating polyamine containing at least three amine groups.

11. The complex of claim 10 wherein R is a hydrocarbon group selected from the group consisting of aryl, aralkyl, alkaryl, and unsaturated hydrocarbons having at least one allylic hydrogen.

12. The complex of claim 11 wherein the polyamine is pentamethyldiethylenetriamine.

13. The complex of claim 10 wherein R is a hydrocarbon group selected from the group consisting of benzyl, phenyl, and allyl.

14. The complex of claim 13 wherein the polyamine is pentamethyldiethylenetriamine.

15. The complex of claim 10 wherein the polyamine is one having the formula

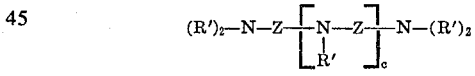

wherein R' can be the same or different alkyl group having from 1 to 10 carbon atoms, Z is defined as 2 to 3 methylenic groups wherein each contains 0 to 2 monovalent alkyl hydrocarbon groups of 1 to 6 carbon atoms; and c is an integer from 1 to 6.

16. The complex of claim 15 wherein R in RNa is a hydrocarbon group selected from the group consisting of aryl, aralkyl, alkaryl, and unsaturated hydrocarbons having at least one allylic hydrogen.

17. The complex of claim 16 wherein c is an integer from 1 to 4.

18. The complex of claim 15 wherein R in RNa is a hydrocarbon group selected from the group consisting of phenyl, benzyl, and allyl.

19. The complex of claim 18 wherein c is an integer from 1 to 4.

20. The complex of claim 10 wherein the polyamine is pentamethyldiethylenetriamine.

21. The complex according to claim 10 wherein the polyamine is tris-(β-dimethylaminoethyl) amine.

* * * * *